United States Patent [19]

Spliethoff

[11] Patent Number: 4,492,084
[45] Date of Patent: Jan. 8, 1985

[54] METHOD FOR SUPPLYING REMOTE HEATING CIRCUITS WITH HEAT FROM A THERMAL POWER PLANT

[75] Inventor: Heinz Spliethoff, Friedrichsthal, Fed. Rep. of Germany

[73] Assignee: Saarbergwerke Aktiengesellschaft, Saarbrücken, Fed. Rep. of Germany

[21] Appl. No.: 413,385
[22] PCT Filed: Dec. 23, 1981
[86] PCT No.: PCT/EP81/00205
§ 371 Date: Aug. 20, 1982
§ 102(e) Date: Aug. 20, 1982
[87] PCT Pub. No.: WO82/02245
PCT Pub. Date: Jul. 8, 1982

[30] Foreign Application Priority Data

Dec. 23, 1980 [DE] Fed. Rep. of Germany ....... 3048605
Sep. 19, 1981 [DE] Fed. Rep. of Germany ....... 3137379

[51] Int. Cl.³ .............................................. F01K 17/00
[52] U.S. Cl. ........................................ 60/648; 60/659; 237/12.1
[58] Field of Search ................. 60/648, 659, 678; 237/12.1

[56] References Cited

U.S. PATENT DOCUMENTS 4,170,879 10/1979 Laing et al. .......................... 60/648
4,214,450 7/1980 Nagashima et al. .................. 60/648

FOREIGN PATENT DOCUMENTS 1054688 4/1959 Fed. Rep. of Germany ..... 237/12.1
163221 10/1933 Switzerland ....................... 237/12.1

Primary Examiner—Stephen F. Husar

[57] ABSTRACT

Methods by which remote heating circuits are supplied with heat from a thermal power plant by using heat reservoirs located close to the power plant and heating the storage or working medium in a heat exchanger of a heat extraction cycle. The medium is initially heated to a base temperature, for example, when using water, to approximately 95° C., and is further heated immediately prior to being directed into a remote heating circuit to a temperature above 100° C. This two stage heating allows the use of unpressurized heat reservoirs. Additionally, the temperature of the medium is efficiently raised to a level sufficiently to operate the remote heating circuit. Preferably, the medium can further be removed from the reservoirs and heated in a second pass through the heat extraction heat exchanger.

5 Claims, 5 Drawing Figures

METHOD FOR SUPPLYING REMOTE HEATING CIRCUITS WITH HEAT FROM A THERMAL POWER PLANT

FIELD OF THE INVENTION

The invention relates to a method for supplying remote heating circuits with heat which is taken, at least partially, from a thermal power plant, and more particularly to utilizing one or more heat reservoirs located close to the power plant, at the initiation of a long distance heat flow and return line to the remote heating circuit, preferably using water as the working medium.

BACKGROUND OF THE INVENTION

Direct use of the heat of condensation from thermal power plants is uneconomical, particularly over long distances, because of the low temperature of this so-called waste heat having a temperature of about 35° C. The transfer of heat at low temperature requires relatively high volumetric flow of the working medium. As a rule, however, the actual users of the heat are situated far from the locations of large generating plants.

Through appropriate layout and coordination of the power plant components, the heat can be removed at a temperature level desirable for remote heating. In certain thermal power plants, for example, the steam is condensed after discharge from the final turbine stage at a higher pressure, such that, the complete heat of condensation is available for heat utilization, thus sacrificing a substantial portion of the electric power generation, on the order of 30% to 40% of the power generation of the steam generating power plant. The electric energy in this case is a product of steam generation. The maximum power output is available at the maximum heat production, as well as being available at a low heat load, and a lower heat production corresponds to a lower electric power generation.

In other steam generating thermal power plants, where steam is extracted directly fromn the connecting lines, between the medium pressure and low pressure turbine stages, and fed into a heat exchanger, the steam extraction can be adapted to requirements over a wide range of partial load electric power generation. The steam extraction is limited only by the minimum steam volume required for the cooling of the low pressure stage, in a manner such that appropriate pressure relationships are maintained, as well as maintaining the maximum allowable flow rate of the steam volume extraction, and the required steam conditions at the outlet of the medium pressure turbine.

Practically, however, the steam extraction is limited by the electric power load demand at a given point in time, since, as opposed to the former type of plant, the removable heat available decreases in a steam extraction plant when the electric power generated approaches the nominal rated plant capacity.

A basic difficulty, of the combination of electric power generation and heat production for remote heating purposes in thermal steam generating power plants, is the differing transient response time of the heat requirement, and the removable heat available which response depends upon the electric power being generated and which is subject to substantial variations with load. The availability of electric power required is always given priority.

It has already been suggested for the combined generation of electrical power and heat production to install heat reservoirs between the power plant and the remote heating circuit. For example, the heat reservoirs can be charged during low load hours and, during the period of increased heat demand which, for example, corresponds to the hours of peak electric power generation when no extractable heat is available. The stored heat in the reservoirs can then be discharged to the remote heating circuit.

Pressurized reservoirs, for storage of heating water above 100° C., are very expensive, and in practice, are not feasible in the required size. Unpressurized reservoirs, on the other hand, only permit storage at a temperature below 100° C. However, for the efficient operation of a remote heating circuit, particularly in cases of larger distances between the thermal power plant and the remote heating circuit, which must be interconnected with a long distance heat transfer line, a sufficiently high temperature differential between the flow and return, to and from the remote circuit, is essential.

A further disadvantage is that the long distance heating transfer line to the remote heating circuit must be designed for a maximum heat capacity which, however, is only required by the remote user in periods of relatively short duration. If the long distance heat transfer line is only designed for the constant base load of the remote heating circuit, the peak load heat demand must be satisfied by additional heating plants at the end of the long distance transfer line at the rmote heating circuit.

The object, of the present invention, is to provide a method for supplying a remote heating circuit, through a long distance transfer line from a thermal power plant, by using one or more heat reservoirs located close to the power plant, while further providing the capability for generating large amounts of heat sufficient for satisfying peak power demands during a required time period, without affecting the electric power generation, whereby the long distance transfer line, to the remote heating circuit, can always be operated very efficiently at or near its maximum capacity.

SUMMARY OF THE INVENTION

The object is met, in accordance with this invention, by heating the working medium to a constant base temperature, preferably during periods of partial or low power plant load. The temperature of the working medium is raised to a temperature greater than 100° C. immediately before it is fed into the remote heating circuit.

In view thereof, the stored water is preferably recycled through the interconnecting heat exchanger, associated with the heat outlet, a second time and reheated.

When discharging from the heat reservoir, only the differential amount of heat, which is necessary to raise the temperature of the working medium to the predetermined flow temperature of the remote heating circuit above 100° C., is removed from the thermal power plant.

BRIEF DESCRIPTION OF THE DRAWINGS

The above, as well as other features and advantages of this invention, will become apparent through a consideration of the detailed description and accompanying drawings, in which.

DETAILED DESCRIPTION OF THE INVENTION

Figure 1:
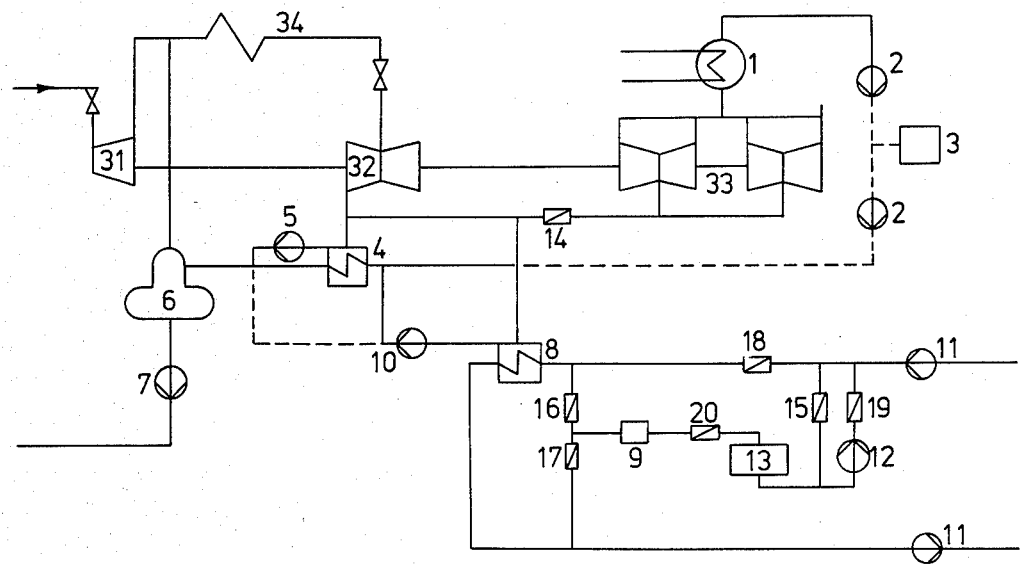
FIG. 1 is an exemplary schematic diagram of a power plant with one heat removal reservoir located proximate to the power plant.

The method, in accordance with this invention, is particularly useful in combination with steam generating power plants with extraction of steam heat. During partial load, as required to meet electrical energy demand, heating power for remote use can be extracted in any amount within the capacity limit of the steam generator and independently of the rate of electric power being generated, and can be equal to or greater than the immediate heat requirement of the remote heating circuit.

In the case where efficient and sufficiently large heat reservoirs are available, the electrical generation and heat extraction can be separated from each other in time so that no heat or only limited heat flows must be removed from the power plant during peak load hours. Only sufficient heat flow necessary to raise the remote heat flow temperature to above 100° C. is removed, and the heat supply of the remote heating circuit is provided from the heat reservoirs during such times. This also results in a better utilization of the power plant, particularly at night. Availability and efficient utilization of the long distance heat line to the remote heating circuit remain because the predetermined flow temperature is ensured. The use of unpressurized hot water reservoirs with a storage temperature of approximately 95° C. is most advantageous.

If the power plant is operated below its nominal capacity, heat at flow temperatures above 100° C. can be extracted directly to the heating circuit without affecting the electrical generation, because the working medium flow temperature is not limited by the condition of the medium in the unpressurized heat reservoir.

In the direct remote heating operation, without connection of the heat reservoirs, the "cold" return water from the remote heating circuit is heated with steam bled from the power plant in a condenser, such as a heat exchanger. In this manner, the water is heated to the predetermined temperature for the remote heating circuit, preferably for example 120° C., and fed back into the remote heating circuit.

In order to "charge" the heat reservoirs, hot flow water from the heat exchanger is mixed with cold return water from the remote circuit and/or cold heat reservoir water in a mixing device, so as to maintain the reservoir charge temperature of approximately 95° C.

In order to "discharge" the heat reservoirs, during periods of electrical generation at nominal rated and/or increased heat demand, the hot (95° C.) reservoir water is recycled a second time through the main heat exchanger and heated to the predetermined temperature for the remote heating circuit, and is then fed into the remote circuit. Only as much heat energy as is necessary for bridging the temperature differential between the temperature of the remote circuit and the temperature of the water in the hot reservoir must be extracted from the power plant. Thus the long distance heat supply is assured, at least for a certain period of time, independent of the rate of electric power generation.

It may be advantageous to reduce the temperature differential, for example, where the electric power plant is operating at a high electrical load and the remote heating circuit is simultaneously operating at a low heat demand. In this case, the hot water (95° C.) from the reservoir is divided into two stream portions, only one of which is reheated in a second passage through the main heat exchanger. The stream portions are mixed again before being directed into the long distance transfer line.

The peak heat demand of the remote heating circuit can be met, without excessive heat being transferred through the long distance transfer line, by use of additional heat reservoirs located close to the user, at the end of the long distance transfer line. Heat reservoirs, located close to the user, available to supply heat at the time and rate required to meet peak demand, compensate for the peak heat demand and convert the primary segment of the heat removal system to a base load handling portion. In this manner, the long transfer line can be optimally designed and constructed for a constant transfer capacity, and can be operated at constant conditions.

Where the peak demand of the remote heating circuit is supplied by peak heat power plants within the district heating circuit, the base load requirements of the long distance heat transfer line decrease by a degree equivalent to the peak heat which need not be converted at the base load portion. In a similar manner, the heat reservoirs located close to the users can also be made smaller or even deleted.

During partial electrical load conditions, the electric power plant output can be regulated in connection with the heat extraction to the heat reservoir located close to the power plant and the reservoir water circulation flow, particularly at steam extraction power plants.

In the power plant schematic shown in FIG. 1, steam flows serially through a high pressure turbine 31, an intermediate heater 34, a medium pressure turbine 32 and a double flute low pressure turbine 33.

Condensate particularly from the low pressure turbine 33 flows to a condenser 1 and is then directed through condensate pumps 2 and a low pressure preheater 4 into a feedwater tank 6. Feedwater is directed from the tank 6 through a feedwater pump 7 to a steam generator. Additionally shown is a cold condensate reservoir 3 and another condensate pump 5.

To remove heat from the steam generation heat extraction power plant, for supply to a remote heating circuit, steam is extracted upstream of a throttle valve 14 in the overflow lines, between the medium pressure turbine 32 and the low pressure turbine 33, or from any other suitable location providing high performance turbine discharge fluid, and is fed into the primary side of a heat exchanger 8. The condensate from the heat exchanger 8 is pumped through another condensate pump 10 and through a line to the feedwater container 6.

The water, returning from the remote heating circuit, is directed through the secondary side of the heat exchanger 8, and thereby heated to a predetermined flow temperature for the remote heating circuit, for example, approximately 120° C.

Figure 2A:
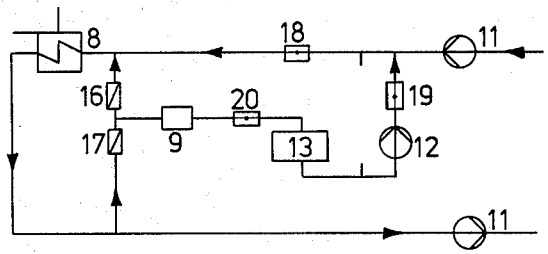
FIGS. 2a, 2b, 2c and 2d schematically illustrate flow path connections corresponding to various modes of operation of the heat extraction system interconnected to the remote heating circuits, all according to the teachings of this invention.
Figure 2B:
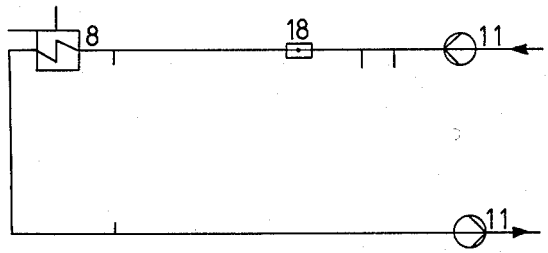

For direct supply of heated water to the remote heating circuit, without the addition of heat from a reservoir 13, "cold" return water is directed through a control valve 18 to the heat exchanger 8, where it is heated to the predetermined flow temperature and returned directly to the remote heating circuit, as shown in FIG. 2b. The heat reservoir 13 is isolated from the water circulating through the remote heating circuit by control and shut-off valves 15, 16, 17, 19 and 20.

For charging the heat reservoir 13 (FIG. 2a), hot flow water from the heat exchanger 8 is directed through the control valve 17 and the shut-off valve 20. Simultaneously, a volume of cold feedwater, corresponding to the volume of hot water directed to the heat reservoir 13, is directed through a pump 12 and the open shut-off valve 19, and directed, into the line, returning water from the remote heating circuit to the heat exchanger 8. This results in a balanced circulation flow superimposed on the remote-heat water current circulating in the vicinity of heat exchanger 8 during charging of the heat reservoir 13. The shut-off valve 15 is subsequently opened, parallel to the pump 12, and the shut-off valve 19 is closed.

Long distance heating pumps 11 are contemplated for placement in the long distance lines flowing to, and returning from the remote circuit.

The heat reservoir 13 can be constructed as an unpressurized hot water reservoir. Cold return water can be extracted, from the long distance heating network upstream of the heat exchanger 8, through the control valve 16, and the cold feedwater can be directed through shut-off valve 19 into the return line and mixed with the hot flow water in the heat reservoir 13. For better mixing of the two water volumes, a mixing device 9 is placed in the feed line to the reservoir 13. Through selective control of control valves 16 and 17, a constant base temperature at the heat reservoir 13 (approximately 95° C.) is maintained.

Figure 2C:
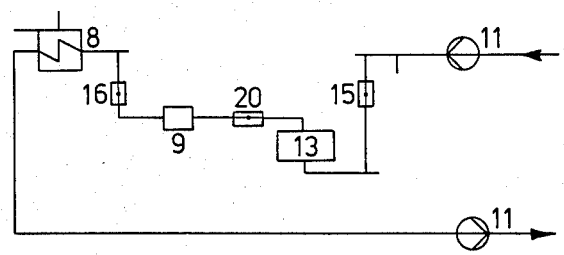

For discharge of heat from the reservoir 13 and removal of heat from the power plant (FIG. 2c), the heat reservoir 13 and the heat exchanger 8 are valved into the long distance heating line. The control and shut-off valves 17, 18 and 19 are closed and the pump 12 is shut down. The cold return water is directed through the shut-off valve 15 to the heat reservoir 13, and a corresponding volume of water at a temperature of approximately 95° C. is removed from the reservoir 13 through the shut-off valve 20 and the control valve 16. This water is heated in heat exchanger 8 to the desired temperature, for example, approximately 120° C., and directed through the long distance heat flow line as hot water.

Figure 2D:
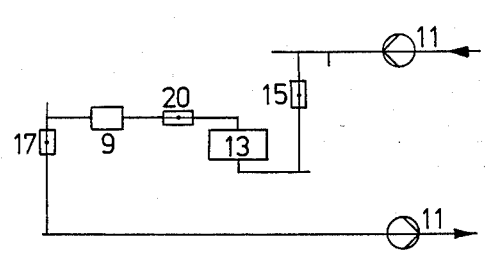

If the heat exchanger 8 is isolated from the remote heating circuit (FIG. 2d) by closing the control valve 16 and the shut-off valve 18, and by opening control valve 17, then the heat reservoir 13 supplies energy directly into the remote heating circuit. The flow temperature is, however, reduced, and corresponds to the temperature of the 95° C. hot feedwater in the reservoir 13.

For meeting peak heat load demands, in the remote circuit, additional heat reservoirs are contemplated at the end of the long distance heat line, particularly at the outlets of the long distance heat lines into the individual remote heat user circuits. The connection of individual remote heating circuits to the long distance heat line can be done in a manner similar to the described circuit about the heat reservoir 13. However, the ability to readily increase the temperature of the feedwater, discharged from remote unpressurized heat reservoirs prior to discharge into the individual remote heating circuits, is here eliminated. This may, if necessary, be performed by provision of peak load heating plants located close to the user.

I claim:

1. A method for supplying remote heating circuits with heat, which is taken at least partly from a thermal power plant, and utilizing at least one heat reservoir, located close to the power plant, at the beginning of a long distance heating flow and a return line to long distance heating circuits, preferably with water as a storage medium, comprising the steps of heating the storage medium to a constant base temperature by means of a first circulation through a heat exchanger of a heat delivery unit, and raising the temperature of the storage medium to a value of greater than 110° C. immediately before it enters the remote heating circuit by means of a second circulation of the storage medium through said heat exchanger of said heat delivery unit.

2. A method according to claim 1 wherein the at least one heat reservoir (13) is an unpressurized hot water reservoir and the base temperature is 95° C.

3. A method according to claim 1 including the step of adjusting the charge temperature to a temperature below 100° C. prior to entering the at least one heat reservoir (13) by mixing of the cold reservoir circulation stream and/or the long distance heat return flow with the hot circulation water volume from the output of the heat exchanger (8) in a mixing device (9).

4. A method according to claim 1 including the steps of dividing the hot feedwater stream taken from the heat reservoir (13) into a first and a second partial stream, and wherein the temperature of the first partial stream is raised in a second run through a heat exchanger (8) and mixing the first partial stream with the second partial stream again, before being fed into the flow, in the long distance heat transfer line.

5. A method according to claim 1 including the step of adjusting the electric power plant output to the heat reservoir (13) located close to the power plant with relation to the feedwater stream.

* * * * *